Sept. 5, 1967  J. H. ANDERSON  3,339,663
VEHICULAR POWER PLANT
Filed June 9, 1964  2 Sheets-Sheet 1
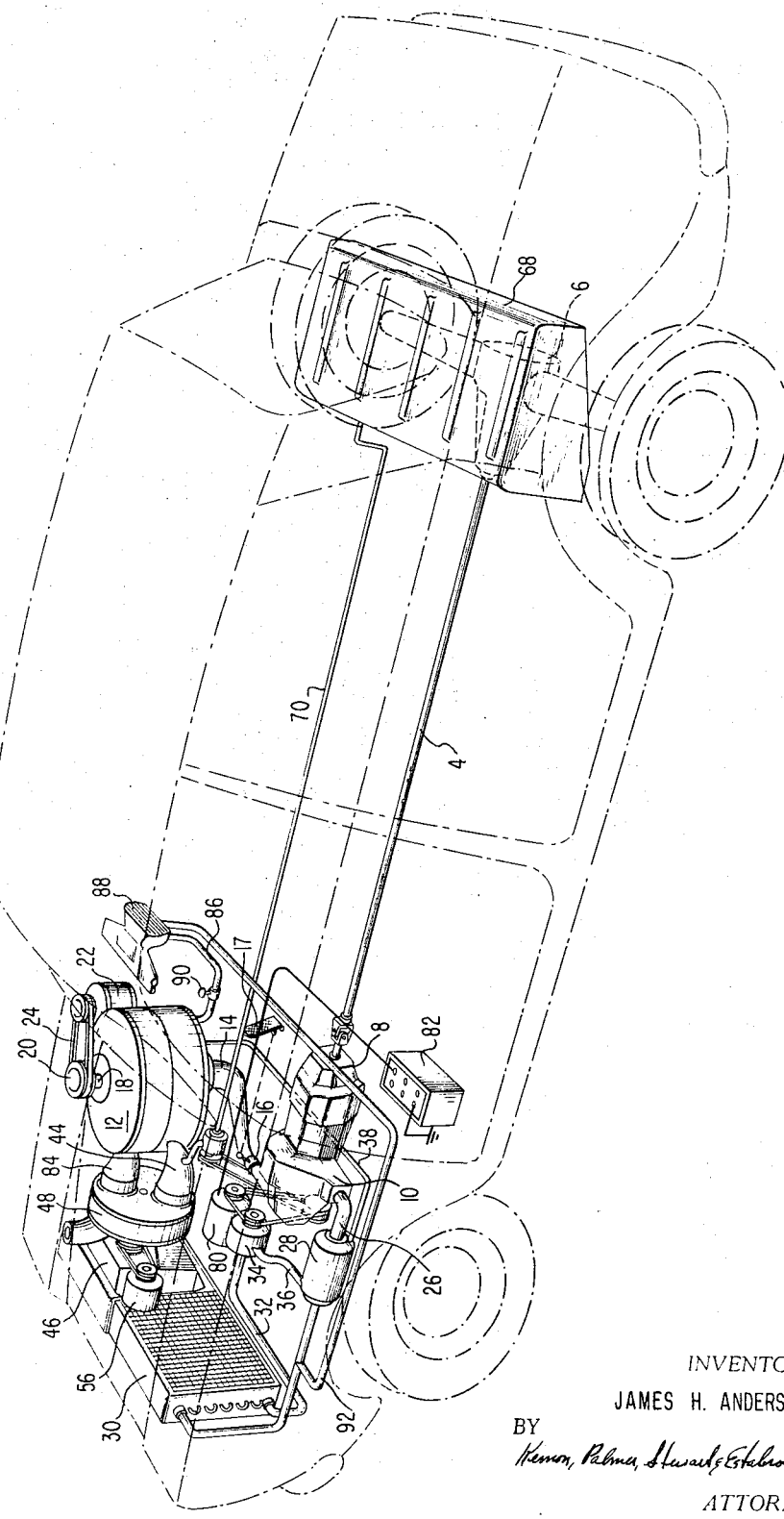
INVENTOR.
JAMES H. ANDERSON
BY
ATTORNEYS

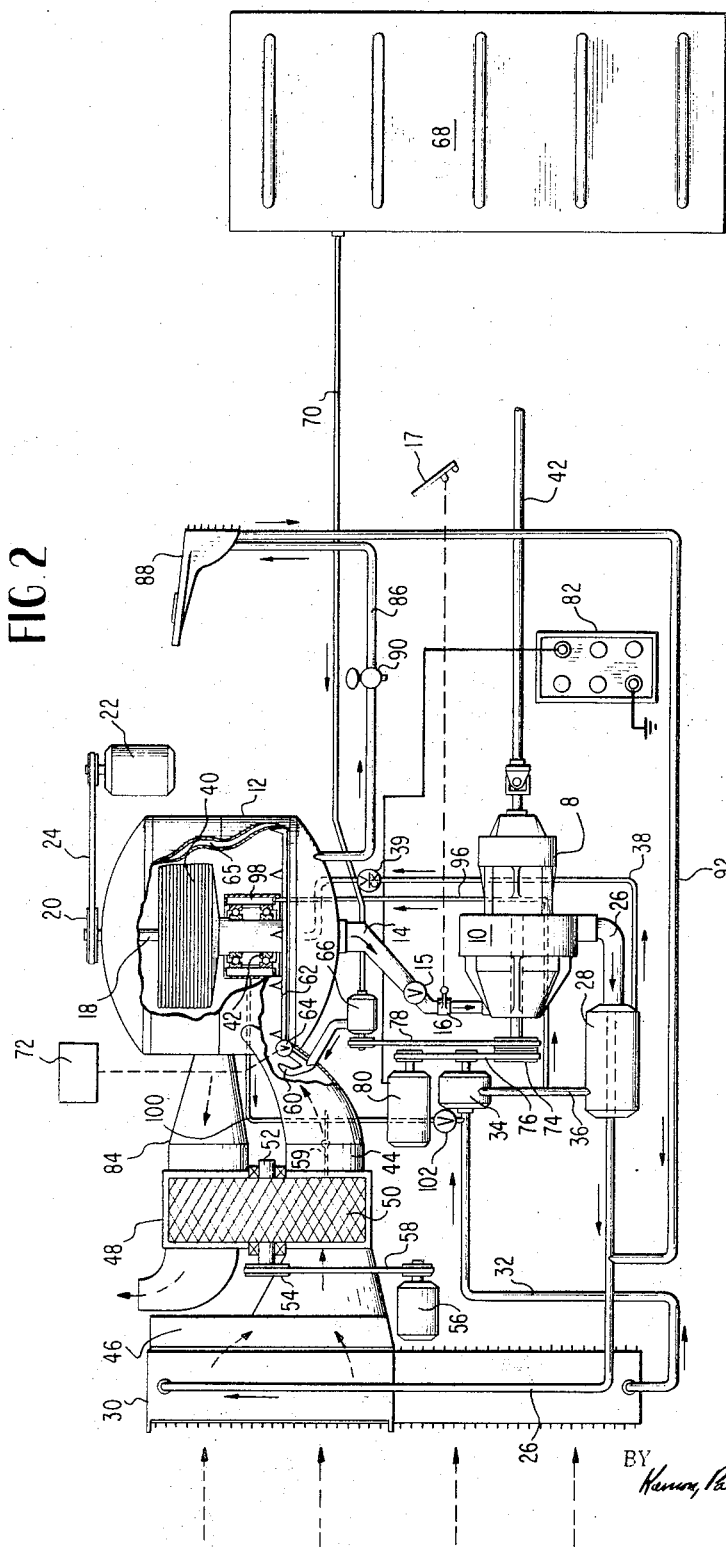

United States Patent Office 3,339,663
Patented Sept. 5, 1967

3,339,663
VEHICULAR POWER PLANT
James H. Anderson, 1615 Hillock Lane,
York, Pa. 17403
Filed June 9, 1964, Ser. No. 373,661
12 Claims. (Cl. 180—67)

This invention relates generally to power plants and more particularly to a new and improved vapor-turbine prime mover for motor vehicles and the like.

In the past, vehicles have been powered almost exclusively by internal combustion engines of the reciprocating piston variety. Although this type of power plant has been highly suited for these purposes, it has many disadvantages which are making its continued use less desirable in the light of present day technological advances.

One of the more serious disadvantages of the existing internal combustion reciprocating engine, and one of the greatest reasons for the pressure to find a substitute power system therefore, lies in its contribution to the air pollution and noise problems in our increasingly urban civilization. Among other problems, inherent in this type of power plant, are; high weight-power ratios; requirement for the higher octane, more expensive types of hydrocarbon fuels; cycle inefficiency engine cooling problems at low vehicle speed; the requirement for complicated transmission-clutch and electrical ignition system; cyclical vibration and pulsating gas flow requiring shock and vibration supports as well as noise suppressing insulation and mufflers; complicated valve and valve-operating system; and the production of dirt, grease and oil deposits which contaminate the engine compartment of the vehicle, the garages in which they are serviced and the roads on which they travel.

To overcome these problems a great amount of time and research has been expended in recent years to develop and adapt the gas turbine-compressor type of engine to automotive power plants. Although this system effectively eliminates many of the problems attendant with the use of the reciprocating internal combustion engine and, it is fairly safe to predict, the system will enjoy increasing popularity as an automotive power plant in the future, some of the past problems are not effectively met thereby and the introduction of the gas turbine itself generates new problems which have not heretofore been encountered.

The gas turbine compressor, or the gas system as it will be referred to hereafter for brevity, although developed to the point where it competes with the internal combustion engine in efficiency, is still not a particularly efficient power source. The gas system also operates in a high temperature environment necessitating the use of exotic materials for certain parts thereof and presents problems in the disposition of the high temperature exhaust gases. The exhaust problem of the gas system is further complicated by the high quantity of air and gas taken into and emitted from the engine. The system is also penalized by a characteristic high pitched whistle or "whine" caused by vibration of turbine and compressor elements. This "whine" is nearly impossible to supress entirely and, even though commendable results have been achieved in minimizing this noise, large numbers of these vehicles operating in crowded cities will, nevertheless, present a serious comfort and noise problem.

Further problems, either inherent in, or not solved in the gas system are high starting torque requirements; slow acceleration characteristics because of the inherent lag in power demand to power delivery of high inertia, gas systems and high idling fuel consumption since at least a portion of the turbine-compressor must remain active even when the vehicle is at an idling standstill.

Attempts have been made to overcome some of the disadvantages of the gas system by retaining the gas turbine and substituting another type of gas generator for the compressor-burner portions of the gas system. The free piston gas generator has generally been suggested for this purpose and although it does provide advantages over the above-described systems, notably better fuel economy, this system retains many of the disadvantages of the gas turbine and, at the same time, reintroduces some of the disadvantages of the reciprocating engine. As examples, the gasifier; must be kept active when the vehicle is idling; produces cyclical vibration that must be isolated; requires complicated fuel injection and ignition timing system; has pulsating flow requiring mufflers or other noise suppressors. In addition, the turbine of this system also generates the same sort of turbine noise as is produced in the gas system.

A more ideal solution to the above problems could be achieved by incorporating a vapor or steam turbine-boiler power plant in place of the gas turbine compressor system. This would furnish an engine having most of the beneficial characteristics of the gas system set forth above and, in addition, would provide a system which avoids most of the disadvantages thereof. For example, a vapor system having stored energy ready for instant use in combination with a low inertia turbine furnishes a high power plant acceleration capability. The turbine in a vapor system also need not be active when the vehicle is not in motion to thereby furnish a system which has a minimum fuel consumption at a time the other types of engines would normally have to idle. This feature eliminates the difficulty of cooling the engine at idle which is a serious problem in all of the prior systems since cooling airflow is at a minimum at that time. Furthermore, since the turbine is not in communication with the atmosphere and the compressor is eliminated, the turbine-compressor "whine" of the gas systems is essentially eliminated. In addition, the quantity and temperature of air required to operate the boiler of a vapor system is greatly reduced over the gas turbine system thereby simplifying the problem of handling the high flow rate gas and high temperature exhaust.

The vapor powered systems of the past art have, however, presented serious drawbacks which have made their use unfeasible, particularly as automotive power plants. In an open steam system, there is a necessity for carrying large quantities of liquid to produce the steam. Steam systems of the past have also required large heavy boilers and large capacity vapor systems thereby decreasing the power-weight ratio, the amount of usable space in the vehicle and increasing the amount of time required to heat the liquid to a usable state. The time required to build up steam from a cold boiler has been perhaps one of the main reasons steam power systems have never achieved widespread continuous use in automobiles.

This invention provides a solution to most of the major problems of the vapor systems enumerated above by providing a closed cycle vapor-turbine system which operates on a high volatility boiling liquid vaporized by a novel, lightweight boiler.

Accordingly it is an object of this invention to provide a novel prime mover system for vehicles which avoids the disadvantages of the prior art, the system being powered by a rotary boiler utilizing a high volatility boiling liquid in a closed, regenerative vapor-liquid cycle.

It is also an object of this invention to provide a vapor-turbine system which eliminates the requirement for large capacity vapor producing liquid storage by incorporating a closed cycle vapor regenerating system.

It is another object of this invention to provide a vapor-turbine system which has a relatively small, lightweight boiling apparatus particularly suited for vaporizing high volatility boiling liquid compounds by incorporating a a boiler having a rotating vapor-tube assembly in the system.

It is still another object of this invention to provide a new, highly efficient vapor turbine prime mover system for vehicles by utilizing, in a closed circuit, a halogenated hydrocarbon boiling liquid.

It is yet a further object of this invention to provide a highly efficient, high energy recovery vapor regenerating cycle for a vapor turbine system by incorporating in the system both an air-to-exhaust and a vapor-to-liquid heat recuperator.

It is yet another object of this invention to provide a new vapor turbine prime mover for vehicles which has high acceleration characteristics by incorporating a low inertia, highly efficient turbine configuration in combination with a high density turbine driving vapor.

It is still a further object of this invention to provide a new vapor turbine prime mover for vehicles which eliminates power plant warm up time by incorporating a minimum volume liquid system in a fully insulated boiler so that pressure may be perpetually maintained in the system with a minimum expenditure of fuel.

These and other objects of this invention will become better understood by those skilled in the art by reference to the following detailed description when viewed with reference to the accompanying drawings in which like numerals indicate the parts throughout the figures thereof and wherein:

FIGURE 1 is a perspective view of a vapor-turbine system in accordance with the invention showing the system in a configuration suitable for powering an automotive vehicle.

FIGURE 2 is largely schematic and enlarged detail view of the system of FIGURE 1.

The above-stated objects are achieved, in this invention, by the provision of a closed vapor-turbine system utilizing a rotary boiler and a high volatility boiling liquid. The rotary boiler allows the safe and economical use of such fluids as the halogenated hydrocarbons for the boiling liquid of the system. The rotary type boiler also affords a much smaller and lighter boiling unit than can be achieved with a stationary boiler thereby providing a system ideally adapted for automotive vehicles. The smaller boiler presents an easily insulated configuration to enable the economical, perpetual maintenence of pressure in the boiler. The rotary feature of the boiler also provides, through the centrifugal force generated by rotation, a portion of the pumping requirements for the system and a fast pressure build up from a cold boiler.

Referring now to FIGURE 1 of the drawings, a vapor-turbine system embodying the invention is shown in perspective. In this view, an automobile, shown in phantom lines, is provided with a drive shaft 4 which connects a conventional differential and rear axle assembly 6 and a transmission 8 to serve as a power train to the vehicle wheels.

A vapor turbine assembly 10 is mounted at the front of the transmission 8 to be drivingly connected to the drive shaft 4 thereby. Communicating with the turbine 10 through a vapor output conduit 14, a boiler 12 is mounted proximate the turbine to provide motive force therefore. The conduit 14 is also provided with a shut-off valve 15 disposed therein proximate the boiler to serve a function which will be discussed in greater detail later. Vapor flow for the turbine is controlled by vapor output conduit valve 16 disposed in the vapor output conduit 14, the valve, in turn being operated by a connection, through any suitable mechanical, electrical or hydraulic linkage, to the vehicle accelerator pedal 17.

The boiler 12 is of the vapor tube type, as opposed to a fire-tube-type boiler. The boiler is provided with a rotary vapor tube assembly 40 (FIGURE 2) which is mounted on a vertical shaft 18 disposed through the boiler. A pulley 20 is mounted at the top of the shaft 18 and is drivingly connected to a motor 22 by a drive belt 24 to provide power for rotation of the vapor tube assembly. Although rotary vapor tube boilers in general are old in the art it is specifically intended that the rotary vapor tube boiler disclosed in greater detail in the applicant's copending application S.N. 402,993, filed Oct. 12, 1964 now Patent 3,260,050, issued July 12, 1966, be incorporated in this system.

An exhaust duct 26 is mounted at the outlet of the turbine 10 to transmit the axhaust vapor from the turbine through a liquid-to-vapor recuperator 28 to a condenser 30 mounted at the forward, air intake portion of the vehicle. A liquid return line 32 transmits the condenser liquid from the condenser 30 to a boiler feed pump 34. From the boiler feed pump the liquid is transmitted under pressure by way of a pump outlet line 36 to the recuperator 28 and from there, by way of a boiler return line 38, to the inlet of the boiler 12. A check valve 39 (FIGURE 2) is disposed in the line 38 proximate the boiler for purposes to be discussed later.

Referring to FIGURE 2 of the drawings, the fluid system is shown in greater detail with the flow directions thereof indicated by the arrows. The boiler 12, shown partly in section, has the vapor tube assembly 40 mounted on the vertical shaft 18 for rotation within the boiler on bearings 42. The rotary vapor-tube assembly 40 is formed of a hollow tube wound peripherally around a drum to form an annular, "tub" shaped structure as shown.

Combustion air is supplied to the boiler through an intake air duct 44 which transmits air from an intake air gathering duct 46, mounted on the rear of the condenser 30, through an intake-air-to-exhaust gas recuperator 48 to the boiler 12. The recuperator 48 is of a rotary type and consists of a heat exchanging rotary screen drum 50 mounted to rotate on shaft 52 so that it passes through the intake air duct. The drum 50 is powered through a pulley 54 mounted on the front of the shaft 52 and drivingly connected to a motor 56 by a drive belt 58. A butterfly valve 59 is provided in the duct 44 behind the recuperator for purposes to be described later.

A pilot fuel nozzle 60 is mounted in the intake air duct 44 and is constructed to supply fuel continuously to the boiler to provide a pilot light therefore. An annular main burner ring 62 is disposed within the boiler and is situated to supply fuel to a main burner section of the boiler adjacent the vapor tube assembly 40. A valve 64 is disposed between the main burner ring and the fuel supply to control the heat supplied to the boiler by the main burners.

The boiler is provided with an insulating jacket 65 which completely surrounds the components thereof. This insulation may be of any of the types currently known in the art but is preferably of a double walled, vacuum type such as that used in modern cryogenic storage vessels.

Fuel pump 66, is connected to the burners 60 and 62 and supplies fuel from the fuel tank 68, mounted proximate the rear of the vehicle, through a fuel supply line 70. A fuel control 72 is connected to the fuel supply valve 64 to automatically control fuel flow in accordance with the desired temperature or pressure required in the boiler.

A power take off assembly 74 is mounted on the forward portion of the turbine 10 and furnishes driving power for the boiler feed pump 34 and the fuel pump 66 through drive belts 76 and 78 respectively. A generator 80 is also connected to the power take off through drive belt 76 and serves to recharge an electric storage battery 82 in the conventional manner. The storage battery 82 provides electrical power for the recuperator motor 56 and the vapor tube assembly rotating motor 22 as well as the lights, radio and other electrically powered accessories normally included in automotive vehicles. The power take-off may also drive pumps for hydro-pneumatic accummulators to provide power steering, brakes, etc. for the vehicle and may also provide power for air-conditioning apparatus or the like.

In order to cool certain parts of the system during operation, a portion of the condensed liquid of the fluid circuit may be circulated around these parts to prevent overheating. For example, liquid, continuously taken from the feed pump outlet 36, may be transmitted to the boiler bearings 42 by a cooling conduit 96 and circulated in a jacket 98 around the bearings to provide cooling therefore. The return fluid is transmitted back to the low pressure side of the pump 34 by return line 100 which connects into liquid return line 32. A valve 102 is disposed in the return line 100 to control flow therethrough. The actuation of valve 102 may be automatically controlled by bearing temperature to provide cooling as needed.

The products of combustion from the boiler 12 are conducted by an exhaust duct 84 through the recuperator 48 to the atmosphere. The recuperator is mounted, in relation to the exhaust duct, so that the drum 50 rotates through the exhaust combustion gases in the same way as described above for the intake air duct thereby providing a heat exchange relationship between the exhaust gases and the intake air to provide pre-heating of the intake air.

Heat may be supplied to the passenger compartment of the vehicle by tapping the boiler vapor supply. In the embodiment shown, a heater supply conduit 86 connects the boiler vapor to a heat exchanger in a heater 88 through a heater control valve 90. The vapor supply to the heater 88 in this manner may be circulated through the heater and then returned to the system through heater return conduit 92 entering the turbine vapor exhaust duct 26 prior to its entrance into the condenser 30.

The cycle produced by the above-described system is basically similar to the Rankine cycle with variations. Instead of using water as the power generating boiling fluid, however, it is intended that this system include fluid which in relation to water has a higher vapor pressure, lower specific volume at atmospheric temperatures, higher molecular weight, lower latent heat of vaporization and a lower energy drop per pound of fluid passing through the expansion cycle of the turbine. There are many compounds which would meet these requirements but the ones preferable for use in this cycle are the halogenated hydrocarbons of the type used in refrigeration cycles. These fluids although initially expensive, are particularly suitable for this cycle since they allow the use of a smaller volume of fluid due to their higher energy delivery capability and allow the use of a simple single-stage turbine because they transmit energy to the turbine much more efficiently during their expansion therethrough. Advantageously, fluorocarbons are used as such halogenated hydrocarbons and a preferred compound of this type is octafluorocyclobutane ($C_4F_8$). This compound is a fluorocarbon which has a boiling point of 21.1° F. at standard atmospheric pressure and is commercially available under the trademarked name of "Freon-C 318."

The fluid cycle

In operation, and starting with the fluid in a liquid state in the conduit 32 at the bottom of the condenser 30, the liquid is drawn through the conduit by the boiler feed pump 34 from which it is discharged through the feed pump outlet 36 into the outer chamber of the liquid-to-vapor recuperator 28. In the liquid-to-vapor recuperator, the feed liquid is put into heat exchange relationship with turbine exhaust vapor passing through the center of the chamber in the exhaust duct 26 to be heated thereby. From the recuperator 28 the liquid is then transmitted to the boiler 12 through the boiler return line 38. From this return line the feed liquid is transmitted into the rotating vapor tubes 40 of the boiler. The transfer from the stationary feed line to the rotating structure can be accomplished by any of the sliding seal structures (not shown) commonly in use for such purposes. The rotary vapor tube assembly 40 is rotated at a constant velocity by the motor 22 which drives the shaft 18 through the pulley and drive belt 20 and 24 respectively. Although rotating velocities on the order of 2000 r.p.m. are anticipated for this system, the rate would, of course, be dependent upon the particular characteristics and size of the system. The size of the system is, in turn, determined by the maximum horsepower requirement of the prime mover itself.

The rotation of the vapor tube assembly 40 provides several unique advantages which enable the system, as a whole, to function efficiently as a vehicle power plant. First of all, the rotation of the vapor tube assembly in itself, through the centrifugal force generated by rotation, affords a pumping action in the fluid introduced into the vapor tubes thereby reducing the power requirement of the boiler feed pump 34. Secondly, since the time required to build up vapor pressure from a cold boiler is an important factor in automotive or other type of vehicles in which the system is to be used, the immediate pre-pressurization of the liquid in the vapor tubes caused by the rotation of the vapor tubes aids in reducing the time required to build up system pressure. Thirdly, since the heat exchange between the hot gases in a boiler and the fluid in the vapor tubes is proportional to the relative velocity between the hot gases and the outer surfaces of the tubes, the heat exchange rate in a rotary vapor tube system is much greater per unit length of vapor tube exposed to the gases than would be possible in a stationary tube type of boiler. Since the vapor tubes are constantly rotating in what is essentially a still atmosphere of hot gases, a constant high relative velocity of gas-to-vapor tube surface may be maintained on a minimum length of vapor tubing. If the same relative velocity were to be achieved with a stationary vapor tube boiler in the same unit period of time, provision would have to be made to move the gases at the same velocity as the rotary assembly provides and the vapor tubes would have to be of much greater length since the hot gases, being the moving medium, would travel a great linear distance in the same unit of time as the equivalent rotary distance traveled by the rotating vapor tubes. This enables the provision of an extremely small boiler as compared to a stationary vapor tube boiler of equivalent horsepower. This reduction in size also provides additional advantages in that a smaller volume of liquid may be used in the system, this smaller amount of liquid, in turn enabling a quicker heating of the liquid from a cold boiler situation and/or a minimum heat input requirement to maintain the fluid at the operating pressure temperature. It is anticipated that, for a prime mover of sufficient capacity to power the average automotive vehicle, a fluid system capacity on the order of 1-to-2 gallons will be required. Because of the size, the boiler may also be more efficiently insulated using a minimum amount of insulation since the over-all geometry thereof is smaller.

A fourth benefit realized by the rotary boiler, and one which is particularly important in a system using halogenated hydrocarbons or the like, is the effective elimination of the possibility of hot spots in the boiler. Liquids such as halogenated hydrocarbons deteriorate when subjected to overtemperatures and thereby lose much of their beneficial characteristics. Hot spots, which might subject the liquid to overtemperature are extremely difficult to avoid in stationary boilers since vapor pockets may exist in certain portions of the vapor tubes due to the steady state flow influenced only by gravity in such tubes. The rotary boiler of the present invention insures the continuous coverage of the outer peripheral portion of the vapor tube assembly, that portion which is subjected to the highest hot gas temperature, with the fluid in its liquid form since the liquid, because of its greater density, will be continually influenced toward this portion by centrifugal force.

From the boiler, the fluid, now in a vapor state, is discharged through the vapor output conduit to the vapor output valve 16. This valve is connected to the accelerator pedal 17 through any suitable mechanical or servomotor linkage. When power is not required to run the automobile, the valve is closed and the vapor system is essentially static. When power is required to move the vehicle, the valve is opened to allow the high pressure vapor to enter the turbine 10. Although a single, in line valve for vapor flow control has been specifically described here for simplicity, a more effective control could be achieved through the use of variable flow nozzles in the turbine (not shown) which could be operated through a mechanical linkage or servomotors by the vehicle operator.

The turbine may be of any of the types known in the art but is preferably of a single stage radial outflow type wherein the vapor is introduced at the hub of the turbine and expanded outwardly through vanes and deflectors to the exhaust conduit 26. The energy imparted by the vapor into the turbine is transformed into mechanical power and is transmitted through the transmission 8 and the drive shaft 4 to the differential and rear axle assembly 6 and then to drive the wheels of the vehicle.

From the turbine exhaust conduit 26 the vapor is channeled through the recuperator 28 where it is brought into heat exchange contact with the liquid passing from the boiler feed pump outlet 36 to the boiler return line 38 to transmit heat thereto. From this point the vapor is channeled to the condenser 30 which, operating on air flow through the condenser (dotted arrows), recondenses the vapor to a liquid for discharge into the liquid return line 32. The condenser may be of any type suitable for this purpose such as the "radiator" type heat exchanger now in use in cooling the water system in present day automotive vehicles.

In practice, the condenser should be designed so that liquid will be dammed up in the condenser bottom to provide liquid coverage of enough of the heat exchange surface to cool it below the saturation temperature thereof. A condenser especially suited for use in this system is disclosed in more detail in applicant's copending application Ser. No. 477,402, filed Aug. 5, 1965.

As previously described, the check valve 39 and the shutoff valve 15 are provided in the boiler return line 38 and the vapor output conduit 14 respectively. These valves are situated near the boiler insulating jacket 65 and serve to isolate the fluid system within the boiler when it is shut down to prevent the natural migration of the warm fluid to the coldest part of the system thereby cooling the boiler. The valve 15 could be automatically actuated to close the output conduit 14 by a solenoid operator or the like when the boiler shuts down. Since these valves may tend to leak over long periods of inactivity of the vehicle, a small auxiliary, battery-driven pump (not shown) could be placed in a direct bypass line (not shown) to the boiler side of the valve 39 to compensate for such leakage. Such a pump could be automatically actuated by certain indicia such as the liquid level in the condenser 30. A pump suitable for this function is described in greater detail in conjunction with the condenser disclosure of applicant's last-mentioned copending application.

The boiler heating system

The boiler is heated by an air-fuel mixture burning system within the boiler. This type of combustion system is capable of utilizing any type of reasonably light hydrocarbon fuel interchangeably and operates efficiently on propane, butane, kerosene, low octane or high octane gasoline, diesel oil, etc.

The inlet air is taken through a portion of the condenser 30 into the intake air gathering duct 46 and through the intake air duct 44, into exhaust gas recuperator 48 to the burner section of the boiler. A fan or gas pump (not shown) may be incorporated in the intake to pump air to the boiler when the vehicle is at low speeds. Fuel is supplied from the fuel tank 68 through the fuel supply line 70 by the fuel pump 66 to the pilot fuel nozzle 60 and, through the valve 64, to the main burner ring 62 in the boiler. The burner chamber is generally defined by the inner walls of the boiler 12 and the outer periphery of the rotary vapor tubes 40 so that an anular burner chamber is formed. Incoming air from the intake air duct 44 is distributed around the base of this annular chamber and mixed with fuel sprayer from the main burner ring. Initial ignition may be achieved by any suitable means (not shown) such as a spark plug, hot plug or the like. It is contemplated, as will be described in greater detail later, that the pilot burner may remain in operation throughout the life of the system so that ignition of the main burners will be generally afforded by the pilot burner 60. The hot gases are directed upwardly around the outer periphery of the rotating vapor tube assembly 40 and then exhausted from the boiler through the exhaust duct 84. The above-described gas flow pattern is intended to afford a general idea of the principles of the functioning of the boiler and it should be understood that preheater boiler feed tubes may be disposed around the inner wall of the boiler to form the outer portion of the aforesaid annular burner chamber and that additional vapor tubes may be disposed in the interior of the rotating vapor tube assembly to provide, with proper gas channeling, a vapor superheater portion for the boiler. The specific structure and flow pattern for such a boiler is described in the applicant's aforementioned copending application Ser. No. 402,993. From exhaust duct 84 the gases pass through the gas recuperator 48 to the atmosphere. The combustion of the air-fuel mixture under the above-described conditions is so complete that a very low percentage of carbon monoxide is produced in the exhaust gases. For this reason the exhaust may be directed to the atmosphere at any convenient location without the risk of carbon monoxide contamination of the vehicle and may be used for defrosting or deicing purposes on the outside of the windshield or for any other similar operation.

Although the system, as described, would provide operational readiness in a very short time from a cold boiler, by utilizing modern cryogenic technology, the entire boiler may be insulated with a jacket such as the insulation jacket 65 around the boiler 12 so that heat losses from the boiler may be kept to a minimum. A jacket suitable for such use is described in greater detail in applicant's copending application S.N. 402,993, filed Oct. 12, 1964 now Patent No. 3,260,050, issued July 12, 1966. Of course, any of the structures utilizing the well-known cryogenic techniques such as a double walled vacuum insulation or a double walled vacuum insulation in combination with plastic foam or glass fiber fillers may be used. In addition to the insulation of the boiler, valves may be provided in the lines emanating therefrom to further insulate the interior of the boiler when the vehicle is shut down. In the illustrated embodiment, the butterfly valve 59 is provided in the intake air duct 44. This valve is shut to close the intake air duct when the vehicle is not in operation to prevent the ingress of outside air when the vehicle is not operating and thereby avoiding cooling of the boiler. A similar valve could be placed in the exhaust duct 84 if deemed necessary. Through these and the aforesaid valving in the fluid lines emanating from the boiler, the boiler may be effectively isolated during the shutdown period of the vehicle. The capacity of the fluid system in the boiler in conjunction with the heating capacity of the pilot fuel nozzle is intended to be such that, once the system is brought to pressure by the main burners, the heat from the operation of the pilot fuel nozzle alone is capable of maintaining the pressure if the boiler is isolated and energy is not taken therefrom. By burning fuel from the pilot fuel nozzle alone, pressure may be kept up in the system for indefinite periods of time so that the system is maintained in constant readiness for operation thereby eliminating the need for a warm up or pressure build up which has been necessary with past vapor power systems. With suitable insulation, the cost of maintaining the boiler constantly at pressure will be minimal. For example assuming a boiler housing 24 inches high by 24 inches in diameter, insulation would be required over a surface area of about 18.8 square feet. Assuming a necessary equilibrium temperature for the vapor of 390° F. at a saturation pressure and an ambient temperature of 60° F. the temperature differential between the interior of the boiler and the ambient air would be 330° F. If, for example, a glass fiber insulation was utilized without a vacuum between the walls of the boiler, the conductivity through this insulation could be as low as .23 B.t.u. inches/feet$^2$ hour degrees F. Using a one-inch insulation thickness the heat loss would be:

$$330 \times .23 \times 18.8 \text{ or } 1425 \text{ B.t.u. per hour}$$

Assuming the use of kerosene as a fuel at a cost of 25 cents per gallon, a density of 6.66 pounds per gallon and a heat release rate of 19,000 B.t.u. per pound, the approximate cost for fuel to keep the boiler pressure up for a 24 hour period would be $.0675 or $24.60 a year. If perlite were used or glass fibers with a high vacuum between the walls, the heat conductivity could be as low as 31 B.t.u. per hour, so low that pressure could be maintained for many hours without a pilot light. In this case, with intermittant use of a pilot light as required to keep up pressure, the cost could be as low as 53 cents a year.

With the existence of the continuing source of pressure and heat in the form of a vapor in the boiler, instantaneous heating will be available for the vehicle without requiring a wait for the system to heat up, as is necessary in present vehicles. This is achieved by tapping the vapor from the boiler through the heat conduit 86 and, when the heater valve 90 is turned on, passing the vapor to car heating system, schematically shown by the heater 88, and returning the vapor through heater return conduit 92 to the turbine exhaust 26 proximate the heat exchanger. The source and return points of vapor for the heater may be, of course, disposed at other places within the system, however, the above-described locations are preferable since operation of the heater will not thereby be dependent on vapor flow to the turbine or other portions of the system.

The system, as described above, will operate at vapor pressures in the neighborhood of 300 to 400 pounds per square inch and at vapor temperatures in the area of 400° F. The maximum temperatures at the hottest points in the burner section should not be much in excess of 500° F. These maximums, made possible primarily by the use of a halocarbon boiling liquid, allow the incorporation of relatively low strength low carbon steels or relatively inexpensive and durable structural materials throughout the system thereby providing a power plant which is, overall, of minimum expense and/or maximum durability.

This invention as specifically described furthermore provides an extremely efficient and useful type of prime mover for automotive vehicles. Although the system has been particularly shown incorporated in automotive vehicles, it should be obvious that it can, with ease, be adapted to any type of vehicle where reciprocating internal combustion engines are currently in use. The benefits provided by the invention are achieved simply by the incorporation of a rotary vapor tube boiler in a vapor turbine system utilizing a high energy release boiling liquid in a closed circuit to power a vehicle. Many variations of the basic arrangement described could, of course, be made in the light of the above teachings. What has been set forth is merely exemplary of one embodiment of the invention and is not intended to be a limitation on the various possible practices thereof.

Accordingly, it is to be understood, that within the scope of the appended claims, this invention may be practiced otherwise than as specifically described. What is claimed as new and desired to be protected by Letters Patent of the United States is:

I claim:
1. A prime mover for a vehicle comprising:
   power application means for applying the power from said prime mover to propel said vehicle;
   a power turbine assembly mounted in and carried by said vehicle;
   power transmission means connecting said turbine to said power application means;
   a boiler having a portion of a vapor tube assembly mounted for rotation therein and comprising a continuous vapor tube helically wound to form a vertically disposed cylinder, said cylinder being mounted for rotation about a vertical axis in said boiler, means to rotate said assembly, and insulation surrounding said boiler to retain heat therein;
   means to heat said boiler including:
      a combustion mixture supply;
      a burner;
      and a combustion products exhaust for discharging the products of combustion from said boiler;
      a condenser;
   a fluid circuit interconnecting said boiler, said turbine and said condenser, said circuit having a fluid haloalkane therein vaporizable by said boiler, said circuit delivering vapor from said boiler to said turbine to provide power therefore while transmitting exhaust vapor from said turbine to said condenser for condensation therein and conveying liquid from said condenser to said boiler for vaporization therein, and means in said circuit to circulate said fluid, said circuit including, in series:
      a supply branch from said boiler to said turbine;
      an exhaust branch from said turbine to said condenser;
      and a return branch from said condenser to said boiler;
      and means to control the prime mover.
2. A prime mover in accordance with claim 1 wherein:
   the combustion mixture supply of said means to heat said boiler comprises an air intake duct communicative with the ambient air and the interior of said boiler to transmit air from the atmosphere thereto;
   the burner of said means to heat said boiler is disposed in said boiler and comprises an annular chamber disposed around said vapor tube assembly, a fuel injection nozzle ring disposed in said chamber to supply fuel thereto, fuel ignition means, fuel supply means including valving to supply fuel to said ring, and control means to automatically operate said valve to control the supply of fuel to said ring according to the conditions in said boiler;
   the combustion product exhaust of said means to heat said boiler comprises an exhaust duct communicative with the interior of said boiler and the ambient air;
   wherein valve means are disposed in at least one of said ducts to shut off communication of the interior of said boiler with the ambient air when said vehicle is not in use;
   and wherein an exhaust-gas-to-inlet air heat exchanging recuperator is mounted between said ducts to heat the air in said intake duct and comprises a cylindrical housing communicative with said intake duct and said exhaust duct, a cylindrical drum mounted for rotation in said housing to be in constant heat exchanging relationship with the intake air and products of combustion in said ducts and means to rotate said drum to provide heat exchange between said intake air and said products of combustion.

3. A prime mover in accordance with claim 2 wherein:
the supply branch of said fluid circuit includes a fluid flow regulating means to control the quantity of fluid supplied to said turbine, means for controlling said regulating means;
wherein said return branch of said fluid circuit includes a boiler feed pump to circulate fluid therethrough, means to drive said pump;
and wherein a liquid-to-vapor heat exchanging recuperator is disposed in said exhaust branch between said turbine and said condenser to heat the fluid in said return branch, said recuperator comprising a jacket having an inlet and an outlet communicative with said return branch and in close contact with said exhaust branch to place the return branch fluid in heat exchanging relationship with said exhaust branch, the inlet to said jacket being connected thereto at a point relative to said outlet, most proximate said condenser.

4. A prime mover in accordance with claim 1 wherein the supply branch of said fluid circuit includes a fluid flow regulating means to control the quantity of fluid supplied to said turbine, means for controlling said regulating means;
wherein said return branch of said fluid circuit includes a boiler feed pump to circulate fluid therethrough, means to drive said pump;
and wherein a liquid-to-vapor heat exchanging recuperator is disposed in said exhaust branch between said turbine and said condenser to heat the fluid in said return branch, said recuperator comprising a jacket having an inlet and an outlet communicative with said return branch and in close contact with said exhaust branch to place the return branch fluid in heat exchanging relationship with said exhaust branch, the inlet to said jacket being connected thereto at a point relative to said outlet, most proximate said condenser.

5. A prime mover in accordance with claim 1 wherein means are provided to cool portions of said power plant, said means comprising a liquid retaining cooling jacket around the portion of said power plant to be cooled, a liquid supply means including valving connecting said jacket to said return branch between said means to circulate fluid and said boiler, liquid return means connecting said jacket to said return branch between said condenser and said means to circulate fluid, and means to automatically control fluid flow in said supply and return means.

6. A prime mover in accordance with claim 1 wherein the insulation surrounding said boiler comprises a pair of concentrically disposed containers in spaced relation to one another enclosing said boiler, the containers defining an airtight chamber therebetween, said chamber being evacuated to provide a low rate of thermal conductivity between said containers.

7. A prime mover in accordance with claim 6 wherein said material of low thermal conductivity is disposed in the chamber defined by said containers.

8. A prime mover for vehicles comprising:
power application means for applying power from said prime mover to propel said vehicle;
a power turbine assembly having power transmission means to provide connection to said power application means;
a boiling apparatus having a continuous vapor tube helically wound to form a vertically disposed cylinder mounted for rotation therein, means to rotate said cylinder, and insulation surrounding said boiling apparatus to retain heat therein;
a fluid circuit connecting said boiler to said turbine to provide transmission of vapor from said boiling apparatus to said turbine;
a condenser;
a fluid circuit connecting said turbine and said condenser to provide transmission of exhaust vapor from said turbine to said condenser;
a fluid circuit connecting said condenser and said boiling apparatus to provide delivery of liquid from said condenser to said boiler, a liquid-to-vapor heat exchanging recuperator interposed within the last two-mentioned circuits to place the liquid in the last-mentioned circuit in heat exchange relationship with the exhaust vapor in the other fluid circuit, a fluid pump in said last-mentioned circuit to circulate fluid therethrough;
and a fluorocarbon vaporizable by said boiling apparatus in said circuits to provide power for said turbine.

9. An automotive vehicle comprising frame and ground engaging wheels supporting said frame, a motor mounted on said frame, a transmission and a drive shaft connecting said motor to at least one of said wheels, a vapor-tube-type boiler mounted on said frame, said boiler having a continuous helically wound vapor tube defining a vertically disposed cylinder, said cylinder being mounted for rotation within said boiler, means to heat said boiler, a condenser mounted on said frame, a first fluid circuit interconnecting said boiler with said motor and said motor with said condenser, a second fluid circuit interconnecting said condenser with said boiler, a heat exchanging recuperator interposed in said circuits to place the fluid in the second circuit in heat exchange relationship with the fluid in the first circuit, said first circuit having a vaporizable fluorocarbon therein to provide power to said motor when vaporized in said boiler, means to circulate said fluid, and means including a throttle to control power from the prime mover.

10. An automotive vehicle comprising:
a frame;
ground engaging wheels supporting said frame;
a fuel storage tank in said vehicle;
a power turbine assembly mounted on said frame;
power transmission means connecting said turbine to at least one of said wheels to propel said vehicle;
a boiler mounted on said frame, a portion of the vapor tube assembly of said boiler comprising a continuous vapor tube helically wound to form a vertically disposed cylinder, said portion being mounted for rotation about a vertical axis in said boiler, means to rotate said portion, and insulation surrounding said boiler to retain heat therein;
means to heat said boiler including:
a combustion mixture supply;
a burner disposed in said boiler, means including valving to supply fuel from said storage tank to said burner, and control means to automatically operate said valve to control the supply of fuel to said burner according to the conditions in said boiler;
a combustion products exhaust;
and an exhaust-gas-to-inlet-air heat exchanging recuperator between said supply and said exhaust;
a condenser disposed to circulate air in heat exchange relationship with fluid therein to provide condensation thereof, said air intake duct being disposed to induct a portion of the air circulated through said condenser for transmission to said boiler;
a fluid circuit interconnecting said vapor tube assembly, said turbine and said condenser, said circuit having a halogenated hydrocarbon vaporizable in said boiler therein, said circuit delivering vapor from said boiler to said turbine to provide the power therefore, while transmitting exhaust vapor from said turbine to said condenser for condensation therein and conducting liquid from said condenser to said vapor tube assembly for vaporization therein, said circuit including in series:

a supply branch to said turbine including a fluid flow regulating means to control the quantity of fluid supplied to said turbine, means for controlling said regulating means;

an exhaust branch to said condenser;

a return branch to said boiler including a boiler feed pump to circulate fluid therethrough, means to drive said pump;

and a liquid-to-vapor heat exchanging recuperator in said exhaust branch between said turbine and said condenser to heat the fluid in said return branch.

11. A prime mover for a vehicle comprising power application means for applying the power from said primer mover to propel said vehicle, a power turbine assembly mounted in and carried by said vehicle, power transmission means connecting said turbine to said power application means, a boiler having a portion of a vapor tube assembly thereof mounted for rotation therein, means to rotate said assembly, means to heat said boiler, a condenser, a fluid circuit interconnecting said boiler, said turbine and said condenser, said circuit having a fluid therein vaporizable by said boiler, said circuit delivering vapor from said boiler to said turbine to provide power therefore while transmitting exhaust vapor from said turbine to said condenser for condensation therein and conveying liquid from said condenser to said boiler for vaporization therein, means in said circuit to circulate said fluid, means to control the prime mover, said portion of the vapor tube assembly comprising a continuous vapor tube helically wound to form a cylinder, and said cylinder being mounted for rotation about a vertical axis in said boiler.

12. A prime mover for a vehicle comprising power application means for applying the power from said prime mover to propel said vehicle, a power turbine assembly mounted in and carried by said vehicle, power transmission means connecting said turbine to said power application means, a boiler having a portion of a vapor tube assembly thereof mounted for rotation therein, means to rotate said assembly, means to heat said boiler, a condenser, a fluid circuit interconnecting said boiler, said turbine and said condenser, said circuit having a fluid therein vaporizable by said boiler, said circuit delivering vapor from said boiler to said turbine to provide power therefore while transmitting exhaust vapor from said turbine to said condenser for condensation therein and conveying liquid from said condenser to said boiler for vaporization therein, means in said circuit to circulate said fluid, means to control the prime mover, means to heat the vehicle comprising a heater in the vehicle, vapor supply means including valving connecting the heater to said fluid circuit proximate said boiler, and a vapor return means connecting said heater to said circuit proximate said condenser.

References Cited

UNITED STATES PATENTS

| | | | |
|---|---|---|---|
| 685,567 | 10/1901 | Bullard | 180—67 |
| 729,732 | 6/1903 | Caille | 165—66 X |
| 773,420 | 10/1904 | Raymond | 122—11 |
| 1,322,725 | 11/1919 | Ostolaza | 180—67 |
| 1,753,335 | 4/1930 | Du Pont | 122—3 |
| 1,943,108 | 6/1934 | Colby | 165—7 X |
| 2,040,160 | 5/1936 | Vernet. | |
| 2,169,601 | 8/1939 | Cornelius et al. | 122—11 |
| 2,471,476 | 5/1949 | Benning et al. | 60—36 |
| 2,918,982 | 12/1959 | Vlachos | 180—67 |

BENJAMIN HERSH, *Primary Examiner.*

MILTON SMITH, *Assistant Examiner.*